United States Patent
Logunov

(10) Patent No.: US 10,101,517 B2
(45) Date of Patent: Oct. 16, 2018

(54) OPTICAL FIBER ILLUMINATION SYSTEMS AND METHODS

(71) Applicant: Corning Incorporated, Corning, NY (US)

(72) Inventor: Stephan Lvovich Logunov, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 163 days.

(21) Appl. No.: 15/002,804

(22) Filed: Jan. 21, 2016

(65) Prior Publication Data

US 2016/0238784 A1 Aug. 18, 2016

Related U.S. Application Data

(60) Provisional application No. 62/117,553, filed on Feb. 18, 2015.

(51) Int. Cl.
*F21V 8/00* (2006.01)
*G02B 6/02* (2006.01)

(52) U.S. Cl.
CPC ......... *G02B 6/001* (2013.01); *G02B 6/02366* (2013.01); *G02B 6/02333* (2013.01); *G02B 6/02395* (2013.01)

(58) Field of Classification Search
CPC .............................. G02B 6/0005–6/001; G02B 6/02333–6/02338; F21V 2200/00–2200/40
See application file for complete search history.

(56) References Cited

U.S. PATENT DOCUMENTS

| | | | | |
|---|---|---|---|---|
| 4,763,984 A | * | 8/1988 | Awai | G02B 6/001 362/576 |
| 5,333,228 A | * | 7/1994 | Kingstone | B29C 47/0016 362/556 |
| 6,169,835 B1 | * | 1/2001 | Lambert | G02B 6/0001 385/102 |
| 2006/0140562 A1 | * | 6/2006 | Joseph | G02B 6/001 385/124 |
| 2011/0103757 A1 | * | 5/2011 | Alkemper | C03B 37/01211 385/124 |
| 2013/0314940 A1 | * | 11/2013 | Russert | C03B 37/01222 362/556 |

(Continued)

FOREIGN PATENT DOCUMENTS

EP 0152493 8/1985

OTHER PUBLICATIONS

International Search Report, issued in connection with corresponding PCT application No. PCT/US2016/018142, dated Apr. 26, 2016.

*Primary Examiner* — Mariceli Santiago

(57) ABSTRACT

A light-diffusing optical fiber with a light-guiding core having a plurality of elongated glass rods each oriented substantially parallel with each other and with the length of the optical fiber. The fiber also includes a cladding surrounding the glass core, the cladding having a refractive index similar to, or lower than, a refractive index of the glass core. The light-guiding core includes a plurality of gaps formed between the plurality of elongated glass rods, the plurality of gaps scattering light away from the light-guiding core and through the cladding.

18 Claims, 2 Drawing Sheets

(56) References Cited

U.S. PATENT DOCUMENTS

2014/0198520 A1* 7/2014 Bennett .................. G02B 6/001
362/556
2014/0218958 A1* 8/2014 Fewkes .................. G02B 6/001
362/558
2016/0299276 A1* 10/2016 Yamamoto ............. G02B 1/046

* cited by examiner

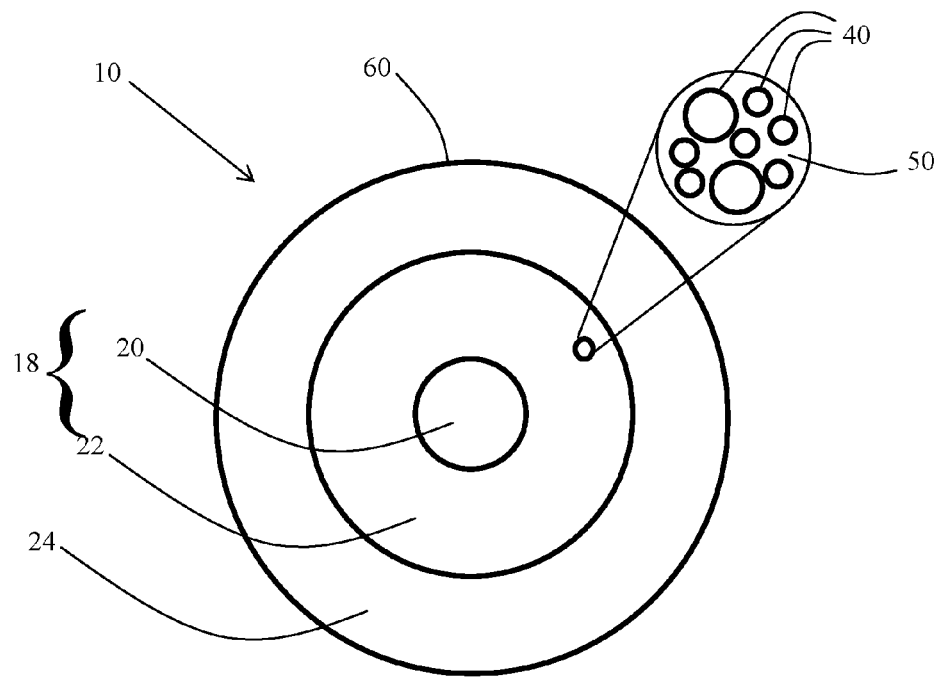

OPTICAL FIBER ILLUMINATION SYSTEMS AND METHODS

This application claims the benefit of priority under 35 U.S.C. § 119 of U.S. Provisional Application Ser. No. 62/117,553 filed on Feb. 18, 2015 the content of which is relied upon and incorporated herein by reference in its entirety.

FIELD OF THE INVENTION

The present specification generally relates to light-diffusing optical fibers for use in illumination applications and, more specifically, to light-diffusing optical fibers having light-scattering airlines formed by a plurality of parallel glass rods at the core of the optical fiber.

BACKGROUND

Optical fibers are used for a variety of applications where light needs to be delivered from a light source to a remote location. Optical telecommunication systems, for example, rely on a network of optical fibers to transmit light from a service provider to system end-users.

Telecommunication optical fibers are designed to operate at near-infrared wavelengths in the range from 800 nm to 1675 nm where there are only relatively low levels of attenuation due to absorption and scattering. This allows most of the light injected into one end of the fiber to exit the opposite end of the fiber with only insubstantial amounts exiting peripherally through the sides of the fiber.

Because optical fibers are typically designed to efficiently deliver light from one end of the fiber to the other end of the fiber over long distances, very little light escapes from the sides of the typical fiber, and, therefore optical fibers are not considered to be well-suited for use in forming an extended illumination source. Yet, there are a number of applications such as special lighting, signage, or biological applications, including bacteria growth and the production of photo-bioenergy and biomass fuels, where select amounts of light need to be provided in an efficient manner to the specified areas. For biomass growth there is a need to develop processes that convert light energy into biomass-based fuels. For special lighting the light source needs to be thin, flexible, and easily modified to variety of different shapes.

Further, there has been a growing need to have optical fibers that are less sensitive to bending than conventional fibers. This need has led to the development of optical fibers that utilize a ring of small non-periodically disposed voids that surround the core region. The void containing ring serves to increase the bend insensitivity—that is to say, the fiber can have a smaller bend radius without suffering a significant change in the attenuation of the optical signal propagating in the fiber. Optical losses are minimized by placing the void containing ring region in the cladding of the optical fiber (some distance from the core); thus, the amount of light propagating through void containing ring region is minimized.

However, light-diffusing optical fibers are expensive to manufacture, thereby reducing their adoption and possible uses. Accordingly, there is a need in the art for more affordable light-diffusing optical fiber.

SUMMARY OF THE INVENTION

The present specification is directed to light-diffusing optical fiber having light-scattering airlines formed by a plurality of parallel glass rods at the core of the optical fiber.

According to an aspect is an light-diffusing optical fiber having: (i) a light-guiding core with a plurality of elongated glass rods each oriented substantially parallel with each other and with the length of the optical fiber; (ii) a cladding surrounding the glass core, the cladding having a refractive index similar to, or lower than, the refractive index of the glass core, where the light-guiding core further has a plurality of gaps formed between the plurality of elongated glass rods, the plurality of gaps scattering light away from the light-guiding core and through the cladding.

According to an embodiment, the plurality of elongated glass rods in an optical fiber are two or more different diameters.

According to an embodiment, the plurality of elongated glass rods are made from a material selected from the group consisting of soda lime, borosilicate, alumiborosilicate, silica, and mixtures thereof.

According to an embodiment, the plurality of elongated glass rods have a diameter of approximately 50 µm or less.

According to an embodiment, the refractive index of the glass core is approximately 1.46 to 1.75.

According to an embodiment, the diameter of the light-guiding core is approximately 100 to 200 µm.

According to an embodiment the optical fiber has a plurality of gaps, the gaps having two or more different sizes.

According to an aspect is an illumination system having a light source configured to generate light, and at least one light-diffusing optical fiber. The light-diffusing optical fiber has: (i) a light-guiding core with a plurality of elongated glass rods each oriented substantially parallel with each other and with the length of the light-diffusing optical fiber; (ii) a cladding surrounding the glass core and having a refractive index similar to, or lower than, a refractive index of the glass core, where the light-guiding has a plurality of gaps formed between the plurality of elongated glass rods, the plurality of gaps scattering light away from the light-guiding core and through the cladding.

According to an embodiment, the light-diffusing optical fiber emits substantially uniform radiation over its length.

According to an embodiment, the cladding comprises either silica based glass or polymer.

According to an embodiment, the light-diffusing optical fiber further includes a coating disposed on an outer surface of the fiber.

According to an embodiment, the light source generates light in 200-2000 nm wavelength range.

According to an embodiment, the optical fiber further includes at least one of pigment, phosphors, fluorescent material, UV absorbing material, hydrophilic material, light modifying material, or a combination thereof.

According to an embodiment, the optical fiber includes plurality of elongated glass rods, each of the rods having one of two or more different diameters.

According to an embodiment, the plurality of elongated glass rods are made of a material selected from the group consisting of soda lime, borosilicate, alumiborosilicate, silica, and mixtures thereof.

According to an embodiment, the plurality of elongated glass rods have a diameter of approximately 50 µm or less.

According to an embodiment, the refractive index of the glass core is approximately 1.46 to 1.75.

According to an embodiment, the diameter of the light-guiding core is approximately 100 to 200 µm.

According to an embodiment, each of the plurality of gaps are one of a plurality of different sizes.

As used herein for purposes of the present disclosure, terms such as "horizontal," "vertical," "front," "back," etc., and the use of Cartesian Coordinates are for the sake of reference in the drawings and for ease of description and are not intended to be strictly limiting either in the description or in the claims as to an absolute orientation and/or direction.

The term "updopant" as used herein is considered to be a dopant which has a propensity to raise the refractive index relative to pure undoped $SiO_2$. The term "downdopant" as used herein is considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

In certain configurations of lighting applications it is desirable to use shorter lengths of fiber, for example, 1-100 meters, although lengths significantly shorter than 1 meter and significantly longer than 100 meters are possible. This requires an increase of scattering loss from the fiber, while being able to maintain good angular scattering properties (uniform dissipation of light away from the axis of the fiber) and good bending performance to avoid bright spots at fiber bends. A desirable attribute of at least some of the embodiments of present disclosure described herein is high illumination along the length of the fiber illuminator. Because the optical fiber is flexible, it allows a wide variety of the illumination shapes to be deployed. There are substantially no bright spots (due to elevated bend losses) at the bending points of the fiber, such that the illumination provided by the fiber does not vary by more than 30%. In some embodiments the illumination variation is less than 20% and sometimes less than 10%. For example, in at least some embodiments, the average scattering loss of the fiber is greater than 50 dB/km, and the scattering loss does not vary more than 30% (i.e., the scattering loss is within ±30% of the average scattering loss) over any given fiber segment of 0.2 m length. According to at least some embodiments, the average scattering loss of the fiber is greater than 50 dB/km, and the scattering loss does not vary more than 30% over the fiber segments of less than 0.05 m length. According to at least some embodiments, the average scattering loss of the fiber is greater than 50 dB/km, and the scattering loss does not vary more than 30% (i.e., ±30%) over the fiber segments 0.01 m length. According to at least some embodiments, the average scattering loss of the fiber is greater than 50 dB/km, and the scattering loss does not vary more than 20% (i.e., ±20%) and in some embodiments by not more than 10% (i.e., ±10%) over the fiber segments 0.01 m length.

In at least some embodiments, the intensity variation of the integrated (diffused) light intensity coming through sides of the fiber at the illumination wavelength is less than 30% for target length of the fiber, which can be, for example, 0.02-100 m length. It is noted that the intensity of integrated light intensity through sides of the fiber at a specified illumination wavelength can be varied by incorporating fluorescence material in the cladding or coating. The wavelength of the light scattering by the fluorescent material is different from the wavelength of the light propagating in the fiber.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 1 is a schematic side view of a section of a light-diffusing optical fiber in accordance with an embodiment.

FIG. 2 is a schematic cross-section of the optical fiber of FIG. 1 as viewed along the direction 12-12.

DETAILED DESCRIPTION OF EMBODIMENTS

Figure 3:
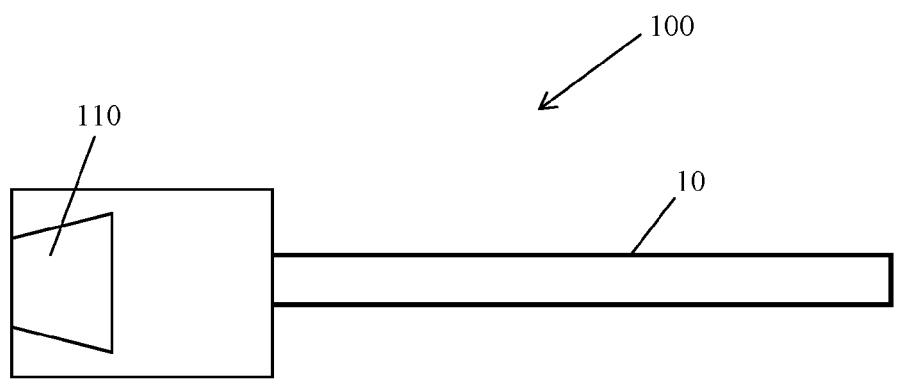
FIG. 3 is a schematic of an illumination system with a light-diffusing optical fiber in accordance with an embodiment.

The present disclosure describes various embodiments of light-diffusing optical fiber. Although optical fibers capable of emitting light along their length have been produced, Applicants have recognized that it would be beneficial to create light-diffusing optical fiber with alternative, more affordable methods.

In view of the foregoing, various embodiments and implementations are directed to light-diffusing optical fiber with light-scattering airlines formed by a plurality of parallel glass bars at the core of the optical fiber. Not only is the manufacturing process for these light-diffusing optical fibers more affordable than prior manufacturing processes such as outside vapor deposition ("OVD"), but the fibers are highly adaptable and malleable.

Reference is now made in detail to the present preferred embodiments of the disclosure, examples of which are illustrated in the accompanying drawings. Whenever possible, like or similar reference numerals are used throughout the drawings to refer to like or similar parts. It should be understood that the embodiments disclosed herein are merely examples, each incorporating certain benefits of the present disclosure.

Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure, in view of but not limited to the embodiments described herein.

Light-Diffusing Optical Fiber

Referring now to FIG. 1, a schematic side view of a section of an example embodiment of a light-diffusing fiber 10 is disclosed. A plurality of voids are disposed in the core of the light-diffusing optical fiber (hereinafter "fiber") 10, the fiber having a central axis ("centerline") 14.

FIG. 2 is a schematic cross-section of an embodiment of light-diffusing optical fiber 10 as viewed along the axis 12-12 in FIG. 1. Light-diffusing fiber 10 can be, for example, any one of the various types of optical fiber with a glass rod region having periodic or non-periodic voids. In an example embodiment, fiber 10 includes an annular core 18 divided into two sections or regions. These core regions can be, for example, a solid central portion 20 and a glass rod portion 22. According to an embodiment, the core may be 100 to 200 µm in diameter, among other sizes. According to yet another embodiment, fiber 10 includes an annular core 18 with a glass rod portion 22 but without a solid central portion 20.

A cladding region 24 ("cladding") surrounds the annular core 18 and has an outer surface. The cladding 24 may have low refractive index to provide a high numerical aperture ("NA"). The cladding 24 can be, for example, a low index polymer material, such as UV or thermally curable fluoroacrylate or silicone, among many others. According to an embodiment, the cladding has a refractive index similar to, or lower than, the refractive index of the glass core.

In some exemplary embodiments, the light-guiding core 18 of light-diffusing fiber 10 comprises a plurality of elongated glass rods 40 each oriented substantially parallel with each other and with the length of the optical fiber along axis 14, such as the example glass rods 40 shown in detail in the magnified inset of FIG. 2. These glass rods are stretched (elongated) along the entire length (i.e. parallel to the longitudinal axis) of the optical fiber. The light-guiding core region 18 also includes a plurality of gaps 50—also called airlines—formed between the plurality of elongated glass rods 40. The gaps scatter light away from the light-guiding core and through the cladding. Glass rods 40 may all be the diameter, or can be several different diameters, or can have random diameters. The glass rods may also be arranged in a predetermined pattern or can be arranged randomly. The size, structure, and patterning of gaps 50 will depend upon the size, structure and patterning of glass rods 40. According to an embodiment, gaps 50 are less than 50 µm, and between approximately 1 and 50 µm. According to an embodiment, the light-diffusing optical fiber emits substantially uniform radiation over its length. In contrast to prior art optical fibers that rely on a high index of refraction at the core-clad interface to scatter light, the novel optical fiber described or otherwise envisioned herein utilizes a low index of refraction to scatter light, namely the gaps 50 which scatter the light away from the light-guiding core 18 and toward the outer surface of the fiber. This low index of refraction is an inherent feature of the gaps 50.

As described above, the gaps 50 scatter the light away from the light-guiding core 18 and toward the outer surface of the fiber. The scattered light is then "diffused" through the outer surface of the fiber 10 to provide the desired illumination. That is, most of the light is diffused (via scattering) through the sides of the fiber 10, along the fiber length. The fiber can have a scattering-induced attenuation of greater than 50 dB/km in the wavelength(s) of the emitted radiation (illumination wavelength). The scattering-induced attenuation is greater than 100 dB/km for this wavelength. In some embodiments, the scattering-induced attenuation is greater than 500 dB/km at this wavelength, and in some embodiments the scattering-induced attenuation can be, e.g., 1000 dB/km, greater than 2000 dB/km, or greater than 5000 dB/km. These high scattering losses are about 2.5 to 250 times higher than the Rayleigh scattering losses in standard single mode and multimode optical fibers.

According to an embodiment, the elongated glass rods 40 are made from a wide range of glass materials such as soda lime, borosilicates, alumiborosilicates, silica, and mixtures, among many others. Glass in regions 20 and 22 may include updopants, such as Ge, Al, and/or P, among others.

An optional coating 60 surrounds the cladding 24. Coating 60 may include a low modulus primary coating layer and a high modulus secondary coating layer. In some embodiments, coating layer 60 comprises a polymer coating such as an acrylate-based or silicone based polymer. In other embodiments, the coating has a constant diameter along the length of the fiber. In some exemplary embodiments, coating 60 is designed to enhance the distribution and/or the nature of "radiated light" that passes from core 18 through cladding 24. The outer surface of the cladding 24, or the of the outer of optional coating 60, represents the "sides" of fiber 10 through which light traveling in the fiber is made to exit via scattering, as described herein. A protective cover or sheath (not shown) optionally covers cladding 24. Fiber 10 may include a fluorinated cladding 24, but the fluorinated cladding is not needed if the fibers are to be used in short-length applications where leakage losses do not degrade the illumination properties.

The light-diffusing fiber 10 as used herein can be made by methods which draw an optical fiber with a plurality of glass rods in the core section 18, thereby causing the formation of gaps 50 in the drawn glass optical fiber. According to an embodiment, the gaps can range in size from about 1 to 50 µm in diameter for circular gaps, or about 1 to 50 µm from one side to another side of a substantially non-circular gap. The fiber's gaps are utilized to scatter or guide the light out of the fiber, via its sides, along the fiber length. That is, the light is guided away from the core 18, through the outer surface of the fiber, to provide the desired illumination. The number of gaps in the fiber will determine the scattering loss of the light-diffusing optical fiber, with more gaps causing greater scattering loss. Accordingly, the scattering loss of the optical fiber can be designed by controlling the number and/or diameter of glass rods 40, which in turn will control the size and number of gaps 50.

As described above, in some embodiments of fiber 10, one or more portions of core section 18 can comprise silica doped with germanium, i.e., germanium-doped silica. Dopants other than germanium, singly or in combination, may be employed within the core, and particularly at or near the centerline 16, of the optical fiber to obtain the desired refractive index and density. In at least some embodiments, the relative refractive index profile of the optical fiber disclosed herein is non-negative in one or more portions of core section 18. In at least some embodiments, the optical fiber contains no index-decreasing dopants in the core. In some embodiments, the relative refractive index profile of the optical fiber disclosed herein is non-negative in one or more portions of core section 18.

In some examples of fiber 10 as used herein, one or more portions of core section 18 comprises pure silica. In one embodiment, a preferred attribute of the fiber is the ability to scatter light out of the fiber (to diffuse light) in the desired spectral range to which biological material is sensitive. In another embodiment, the scattered light may be used for decorative accents and white light applications. The amount of the loss via scattering can be increased by changing the properties of the glass in the fiber, the diameter and number of the glass rods 40, and the properties of the cladding 24 or optional coating 60, among other options.

The NA of fiber 10 can be equal to, or greater than, the NA of a light source directing light into the fiber. The numerical aperture (NA) of fiber 10 can be greater than 0.3, in some embodiments greater than 0.4, and in others greater than 0.5. In some embodiments, the NA is 0.3 to 0.7. According to an embodiment, the refractive index of the core region is approximately 1.46 to 1.75, among other ranges.

In an example embodiment, fiber 10 may include a coating 60 as discussed above in connection with FIG. 2. In one exemplary embodiment, coating 60 includes a hydrophilic coating layer such as a UV-cured acrylate coating that provides improved wet adhesion. The coating layer may be UV curable coatings comprising a low modulus primary coating layer (typically <3 MPa) adjacent to the glass and a higher modulus secondary coating layer (typically >50 MPa). The higher modulus secondary coating layer is adjacent to, and situated over, the primary (lower modulus) coating layer. Other, or additional coatings, applied either as a single layer coating or as a layer in a multi-layer coating may also be utilized. Examples of such materials are hydrophilic coating (not shown) which serves as a cell growth medium or a coating containing a material to provide additional scattering to the escaped light. These coatings may also serve as a protective covering for the fiber 10.

Exemplary hydrophilic coatings for use in coating 60 are those commonly used for improving cell adhesion and growth to surfaces and contain carboxylic acid functionality and amine functionality (e.g. formulations containing acrylic acid or acrylamides). In addition, hydrophilic coatings may be enhanced by serving as a reservoir for nutrients essential for the growth of biological material.

In some exemplary embodiments, coating 60 includes fluorescent or ultraviolet absorbing molecules that serve to modify radiated light. Suitable up or down converter molecules may also be included in the coating to produce light of differing wavelengths from that of the input light source. Ink coating layers may also be applied to alter the color or hue of the emitted light. Other coating embodiments include molecules capable of providing additional scattering to the light emitted from the fiber. A further embodiment may be the inclusion of photo-active catalysts onto the coating that may be used to increase the rate of photo-reactions. One example of just such a catalyst is rutile $TiO_2$, as a photocatalyst.

According to some embodiments, light-diffusing fiber 10 may be enclosed within a polymeric, metal, or glass covering (or coatings), wherein said the coating or covering has a minimum outer dimension (e.g., diameter) greater than 250 µm. If the fiber(s) has a metal coating, the metal coating may contain open sections, to allow light to be preferentially directed into a given area. These additional coatings or coverings may also contain additional compounds to vary the emitted light or catalyze reactions in the same manner as described above for the coatings coated on the fiber.

As stated above, the light-diffusing fiber 10 may comprise a hydrophilic coating disposed on the outer surface of the optical fiber. Also, fluorescent species (e.g., ultraviolet-absorbing material) may be disposed in the optical fiber coating, as well as molecules capable of providing additional scattering of the emitted light. According to some embodiments the light source coupled to the light-diffusing fiber 10 generates light in 200 nm to 500 nm wavelength range and the fluorescent material (fluorescent species) in the fiber coating generates either white, green, red, or NIR (near infrared) light.

Furthermore, an additional coating layer may be provided on the fiber outer surface. This layer may be configured to modify the radiated light, alter the interaction of the coating materials. Examples of just such a coating would be coatings containing materials such as, but not limited to, poly (2-acrylamido-2-methanesulfonic acid), ortho-nitrobenzyl groups, or azobenzene moities respectively.

According to an embodiment, the light-diffusing optical fiber described herein can be formed by first combining a plurality of parallel glass rods to create all or a portion of the core of the fiber. The core can be coated with a cladding material, such as a low-index polymer, which itself can be coated with a secondary coating having a diffusive layer. Any of the embodiments described or otherwise envisioned herein may be suitable for the manufacturing process. The glass rod stack can be redraw to the cane first, and the resulting cane can be placed inside a structure with similar material or different lower index material glass, and the resulting fiber can be drawn to form the light-diffusing optical fiber. This manufacturing process is more affordable than the OVD process traditionally used to create voids for light-diffusing optical fiber.

The optical fiber may also have ink layer on top of or over the coating 60 in order to homogenize scattering in angular space. For example, the ink layer may comprise a white ink (secondary coating material loaded with $TiO_2$ nanoparticles). Thus, the light-diffusing layer may include an outer layer with a polymer having light-scattering nanoparticles such as $TiO_2$, Zr, silica, other glass or crystals with sizes <0.5 µm, among other possibilities.

Illumination Systems

Referring to FIG. 3 is an embodiment of an illumination system 100 containing one or more light-diffusing optical fibers 10, which can be, for example, any of the optical fiber embodiments described or otherwise envisioned herein. For example, as described herein, fiber 10 can be a light-diffusing fiber comprising a core, cladding, and a plurality of glass rods and gaps situated within the core or at a core-cladding boundary. This optical fiber can further include an outer surface. As described above, the light-diffusing optical fiber 10 is configured to scatter guided light via the gaps away from the core and through the outer surface, to form a light-source fiber portion that emits radiation over its length. Illumination system 100 also includes a first light source 1210 which is optically coupled to a first end of the optical fiber 10. The light source may be any of a wide variety of light sources, including but not limited to light emitting diodes (LED). According to some embodiments the light source generates light having at least one wavelength λ within the 200 nm to 2000 nm range.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. A light-diffusing optical fiber comprising:
   a light-guiding core comprising a plurality of elongated glass rods each oriented substantially parallel with each other and with the length of the optical fiber;
   a cladding surrounding the plurality of elongated glass rods of said light-guiding core, the cladding comprising a refractive index similar to, or lower than, a refractive index of the light-guiding core;
   wherein the light-guiding core further comprises a plurality of gas filled gaps formed between the plurality of elongated glass rods, the plurality of gas filled gaps scattering light away from the light-guiding core and through the cladding;
   wherein the light-guiding core further comprises a solid core portion and the plurality of elongated glass rods surround the solid core portion, wherein the plurality of elongated glass rods comprise a plurality of different diameters.

2. The light-diffusing optical fiber of claim 1, wherein the plurality of elongated glass rods comprise a material selected from the group consisting of soda lime, borosilicate, alumiborosilicate, silica, and mixtures thereof.

3. The light-diffusing optical fiber of claim 1, wherein the plurality of elongated glass rods comprise a diameter of approximately 50 μm or less, wherein the plurality of gas filled gaps have at least one dimension less than 50 μm.

4. The light-diffusing optical fiber of claim 1, wherein the refractive index of the light-guiding core is approximately 1.46 to 1.75.

5. The light-diffusing optical fiber of claim 1, wherein the diameter of the light-guiding core is approximately 100 to 200 μm.

6. The light-diffusing optical fiber of claim 1, wherein the plurality of gas filled gaps are air gaps and the air gaps comprise a plurality of different sizes.

7. The light-diffusing fiber of claim 1, further comprising an outer layer, the outer layer comprising a polymer with scattering nanoparticles.

8. An illumination system, comprising:
a light source configured to generate light;
at least one light-diffusing optical fiber comprising: (i) a light-guiding core having a plurality of elongated glass rods each oriented substantially parallel with each other and with the length of the light-diffusing optical fiber; (ii) a cladding surrounding the plurality of elongated glass rods of said light-guiding core, the cladding comprising a refractive index similar to, or lower than, a refractive index of the light-guiding core, wherein the light-guiding core further comprises a plurality of gas filled gaps formed between the plurality of elongated glass rods, the plurality of gas filled gaps scattering light away from the light-guiding core and through the cladding;
wherein the plurality of elongated glass rods comprise a plurality of different diameters.

9. The illumination system of claim 8, wherein the light-diffusing optical fiber emits substantially uniform radiation over its length.

10. The illumination system of claim 8, wherein said cladding comprises either silica based glass or polymer.

11. The illumination system of claim 8, wherein said light-diffusing optical fiber further comprises a coating disposed on an outer surface of the fiber.

12. The illumination system of claim 8, when said light source generates light in 200-2000 nm wavelength range.

13. The illumination system of claim 8, wherein the optical fiber further comprises at least one of pigment, phosphors, fluorescent material, UV absorbing material, hydrophilic material, light modifying material, or a combination thereof.

14. The illumination system of claim 8, wherein the plurality of elongated glass rods comprise a material selected from the group consisting of soda lime, borosilicate, alumiborosilicate, silica, and mixtures thereof.

15. The illumination system of claim 8, wherein the plurality of elongated glass rods comprise a diameter of approximately 50 μm or less.

16. The illumination system of claim 8, wherein the refractive index of the light-guiding core is approximately 1.46 to 1.75.

17. The illumination system of claim 8, wherein the diameter of the light-guiding core is approximately 100 to 200 μm.

18. The illumination system of claim 8, wherein the plurality of gas filled gaps are air gaps and the air gaps comprise a plurality of different sizes.

* * * * *